(12) United States Patent
Canton et al.

(10) Patent No.: US 10,953,988 B2
(45) Date of Patent: Mar. 23, 2021

(54) HEAD STABILIZING HEADREST

(71) Applicant: THE BOEING COMPANY, Chicago, IL (US)

(72) Inventors: Ryan C. Canton, Mukilteo, WA (US); Daniel G. Etcheto, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/289,736

(22) Filed: Mar. 1, 2019

(65) Prior Publication Data

US 2020/0277060 A1 Sep. 3, 2020

(51) Int. Cl.
*B64D 11/06* (2006.01)
*B60N 2/885* (2018.01)
*B60N 2/841* (2018.01)

(52) U.S. Cl.
CPC .......... *B64D 11/0642* (2014.12); *B60N 2/885* (2018.02); *B64D 11/0606* (2014.12); *B60N 2/841* (2018.02)

(58) Field of Classification Search
CPC .......... B60N 2/885; B60N 2/841; B60N 2/60; B60N 3/00; B64D 11/0642; B64D 11/0606; A47C 7/38; A47C 7/66; A47C 16/00
USPC .... 297/391, 392, 184.1, 406, 184.11, 184.15
See application file for complete search history.

(56) References Cited

U.S. PATENT DOCUMENTS

| | | | | |
|---|---|---|---|---|
| 4,205,878 A | * | 6/1980 | Wooten | B60N 2/99 297/391 |
| 5,370,446 A | * | 12/1994 | Bancod | A47C 7/38 297/408 |
| 9,481,277 B1 | * | 11/2016 | Ruelas | B60N 2/885 |
| 10,399,475 B2 | * | 9/2019 | Jalpa | B60N 2/838 |
| 2003/0038521 A1 | | 2/2003 | Johnson | |
| 2004/0158924 A1 | * | 8/2004 | Frandsen-Anderson | A62C 8/06 5/483 |
| 2011/0012406 A1 | * | 1/2011 | Gibson | B60N 2/2851 297/250.1 |
| 2015/0274301 A1 | * | 10/2015 | Udriste | B64D 11/0641 297/217.1 |

FOREIGN PATENT DOCUMENTS

| | | | | |
|---|---|---|---|---|
| DE | 29712497 U1 | * | 9/1997 | .......... B60N 2/2821 |
| DE | 10349929 A1 | * | 7/2004 | ............ B60N 2/885 |
| DE | 202009005915 | | 9/2009 | |
| DE | 102013001336 | | 7/2014 | |

(Continued)

OTHER PUBLICATIONS

Extended European Search Report for EP 20159114.6.1010, dated Jul. 23, 2020.

*Primary Examiner* — Milton Nelson, Jr.

(74) *Attorney, Agent, or Firm* — The Small Patent Law Group LLC; Joseph M. Butscher

(57) ABSTRACT

A headrest for a seat assembly includes a central main body having a first side and a second side that is opposite from the first side. A first lateral stabilizer is moveably coupled to the first side of the central main body. The first lateral stabilizer is distinct from the central main body. A second lateral stabilizer is moveably coupled to the second side of the central main body. The second lateral stabilizer is distinct from the central main body. The first lateral stabilizer and the second lateral stabilizer are movable between retracted positions and stabilizing positions.

20 Claims, 5 Drawing Sheets

(56) References Cited

FOREIGN PATENT DOCUMENTS

| | | | |
|---|---|---|---|
| DE | 102017107153 A1 * | 10/2018 | ............. B60N 2/882 |
| FR | 3047157 A1 * | 8/2017 | ............. B60N 2/885 |
| GB | 2302268 | 1/1997 | |
| JP | H0638703 U * | 5/1994 | ............. B60N 2/885 |
| JP | 09254690 A * | 9/1997 | |
| KR | 20120058011 | 6/2012 | |
| WO | WO-2017118868 A1 * | 7/2017 | ............. B60N 2/885 |

\* cited by examiner

HEAD STABILIZING HEADREST

FIELD OF THE DISCLOSURE

Embodiments of the present disclosure generally relate to seat assemblies, and more particularly to headrests of seat assemblies that are configured to provide increased comfort and stability to an individual.

BACKGROUND OF THE DISCLOSURE

Commercial aircraft transport passengers between locations. During a flight, passengers within an aircraft are seated. A typical seat assembly within an internal cabin includes a headrest. A passenger may decide to rest and/or sleep during a flight. When passengers rest their heads on the headrest in an upright, seated position, the headrest may not be capable of maintaining the head in a stable position. For example, a passenger's head may slump to a side, which may awaken the passenger, who is trying to sleep.

Certain headrests on seats of a commercial aircraft include side flaps. However, the side flaps typically do not remain in position. As such, a head of a passenger in a seated position trying to rest may slide off or otherwise disengage from the headrest as the side flap moves to an undesirable position. For example, side flaps may be moved into a desired position by a passenger. However, as a head of a passenger leans on a side flap, the side flap typically flattens, which may cause a passenger's neck to kink and jar the passenger awake. In general, finding a comfortable resting position during a flight may prove a challenge to many individuals.

SUMMARY OF THE DISCLOSURE

A need exists for a headrest of a seat assembly that is configured to allow a passenger to be supported in a stable, comfortable position, such as during a flight of a commercial aircraft. Further, a need exists for a headrest that increases comfort and restfulness of an individual.

With those needs in mind, certain embodiments of the present disclosure provide a headrest for a seat assembly. The headrest includes a central main body having a first side and a second side that is opposite from the first side. A first lateral stabilizer is moveably coupled to the first side of the central main body. The first lateral stabilizer is distinct from the central main body. A second lateral stabilizer is moveably coupled to the second side of the central main body. The second lateral stabilizer is distinct from the central main body. The first lateral stabilizer and the second lateral stabilizer are movable between retracted positions and stabilizing positions.

In at least one embodiment, front surfaces of the first lateral stabilizer and the second lateral stabilizer are coplanar with a front surface of the central main body when the first lateral stabilizer and the second lateral stabilizer are in the retracted positions. At least portions of the first lateral stabilizer and the second lateral stabilizer are outwardly away from and in front of a plane of the front surface of the central main body when the first lateral stabilizer and the second lateral stabilizer are in the stabilizing positions.

In at least one embodiment, the first lateral stabilizer and the second lateral stabilizer are pivotally coupled to the central main body. For example, the first lateral stabilizer and the second lateral stabilizer are pivotally coupled to the central main through one or more pivot axles.

In at least one embodiment, the first lateral stabilizer and the second lateral stabilizer rotate downwardly into the stabilizing positions to provide lateral barriers on the first side and the second side of the central main body.

The central main body may be fixed in position in relation to a backrest. In at least one embodiment, the central main body may angle upwardly and outwardly on the first side and the second side from a bottom to a top. Each of the first lateral stabilizer and the second lateral stabilizer may have a wide bottom that outwardly recedes to a narrow top. The central main body may expand from a front surface towards a rear surface. Each of the first lateral stabilizer and the second lateral stabilizer may recede from a front surface towards a rear surface. Inner surfaces of the first lateral stabilizer and the second lateral stabilizer may outwardly cant from front surfaces towards rear surfaces.

The central main body may include a notch proximate a central lateral plane at a top.

The headrest may include a collapsible shade. The collapsible shade may be secured to a top of the central main body. The collapsible shade may be secured to one of the first lateral stabilizer or the second lateral stabilizer. One or both of the first lateral stabilizer or the second lateral stabilizer may include a retractable chin rest.

Certain embodiments of the present disclosure provide a seat assembly that includes a base, a seat cushion coupled to the base, a backrest coupled to one or both of the base and the seat cushion, and a headrest coupled to the backrest. The headrest includes a central main body, a first lateral stabilizer, and a second lateral stabilizer, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a headrest for a seat assembly. The headrest includes a central main body having a first side and a second side that is opposite from the first side. A first lateral stabilizer is moveably coupled to the first side of the central main body. A second lateral stabilizer is moveably coupled to the second side of the central main body. The first lateral stabilizer and the second lateral stabilizer are configured to move between retracted positions, in which front surfaces of the first lateral stabilizer and the second lateral stabilizer are generally flush or otherwise coplanar with a front surface of the central main body, and stabilizing positions, in which at least portions of the first lateral stabilizer and the second lateral stabilizer are moved outwardly away from and in front of a plane of the front surface of the central main body. In at least one embodiment, the first lateral stabilizer and the second lateral stabilizer are pivotally coupled to the central main body.

In at least one embodiment, the first and second lateral stabilizers are configured to rotate downwardly into the stabilizing positions to provide lateral barriers on sides of the central main body. The lateral barriers provide resting surfaces for a head of an individual. As such, the central main body supports the back of the head, and the lateral barriers limit lateral movement of the head.

Figure 1:
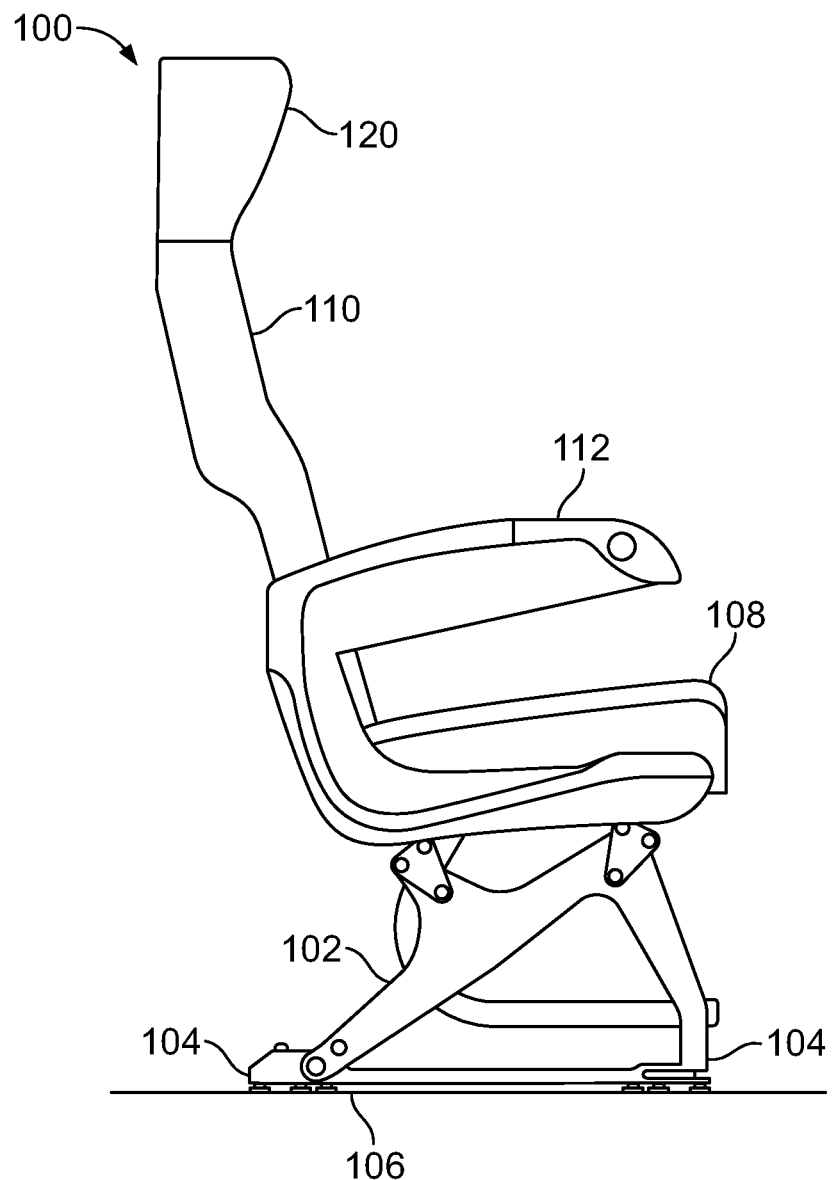
FIG. 1 illustrates a side view of a seat assembly, according to an embodiment of the present disclosure.

FIG. 1 illustrates a side view of a seat assembly 100, according to an embodiment of the present disclosure. In at least one embodiment, the seat assembly 100 is configured to be secured within an interior cabin of a vehicle, such as a commercial aircraft. In at least one other embodiment, the seat assembly 100 is configured to be positioned within a fixed structure, such as a commercial building or residence.

The seat assembly 100 includes a base 102, which may include legs 104 that may be secured to tracks 106 within an interior cabin of a vehicle. The legs 104 may include fittings, fasteners, or the like that are configured to securely connect the legs 104 to the tracks 106. The base 102 supports a seat cushion 108 and a backrest 110, which includes or is otherwise coupled to a headrest 120. Armrests 112 may be pivotally secured to the backrest 110 and/or the base 102.

The seat assembly 100 may be sized and shaped differently than shown. For example, the legs 104 of the seat assembly 100 may not be configured to be secured to tracks within an interior cabin of a vehicle. In at least one embodiment, the seat assembly 100 may include wheels or casters positioned at lower ends of the legs 104. In at least one embodiment, the seat assembly 100 does not include the legs. For example, the seat assembly 100 may include a single support structure extending downwardly from the seat cushion 108. In at least one other embodiment, the base 102 may be secured to a structure, such as a wall, bench, or the like, without legs or a support structure. As another example, the seat assembly 100 may not include the armrests 112.

Figure 2:
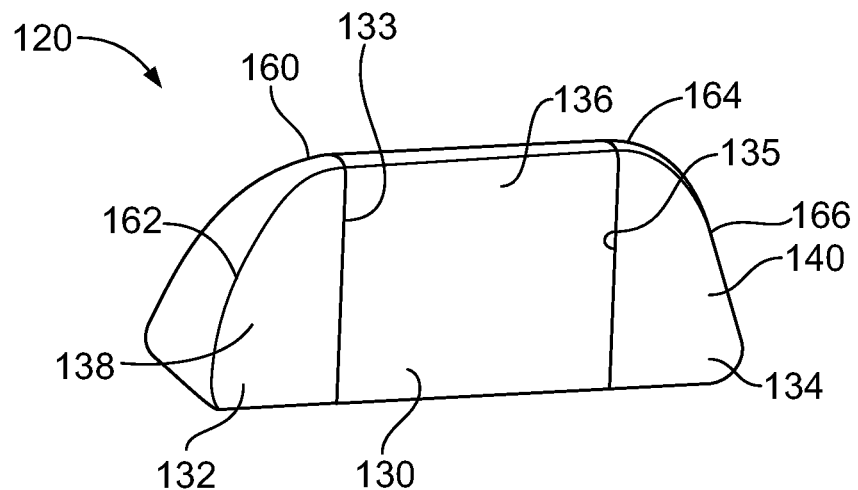
FIG. 2 illustrates a perspective front view of a headrest, according to an embodiment of the present disclosure.

FIG. 2 illustrates a perspective front view of the headrest 120, according to an embodiment of the present disclosure. The headrest 120 is coupled to, or otherwise forms part of, the backrest 110 shown and described with respect to FIG. 1.

The headrest 120 includes a central main body 130, a first lateral stabilizer 132 moveably coupled to the central main body 130, and a second lateral stabilizer 134 moveably coupled to the central main body 130. The first lateral stabilizer 132 and the second lateral stabilizer 134 are distinct from the central main body 130. That is, the first lateral stabilizer 132 and the second lateral stabilizer 134 are split or otherwise separated from the central main body 130. The central main body 130 is fixed in position. For example, the central main body may be fixed in position in relation to the backrest 110 (or form a fixed upper portion of the backrest 110). The first lateral stabilizer 132 is distinct from the central main body 130 and is positioned to a first side 133 of the central main body 130, such as a right side of the central main body 130. The second lateral stabilizer 134 is also distinct from the central main body 130 and is positioned to a second side 135 of the central main body 130, such as a left side of the central main body 130, opposite from the first lateral stabilizer 132.

The central main body 130 includes a front surface 136 that is configured to support a rear portion of a head of an individual. As shown in FIG. 2, the first lateral stabilizer 132 and the second lateral stabilizer 134 are in retracted positions. In the retracted positions, the first lateral stabilizer 132 and the second lateral stabilizer 134 include respective front surfaces 138 and 140 that are also configured to support a rear portion of head of an individual. The front surfaces 136, 138, and 140 may be cushioned to provide comfort to the individual.

Figure 3:
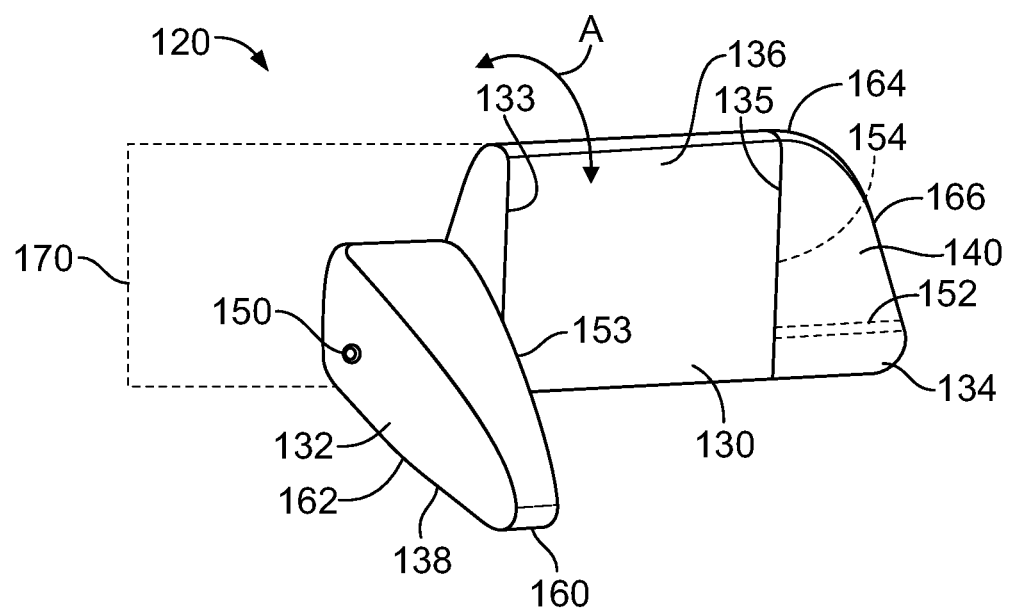
FIG. 3 illustrates a perspective front view of the headrest of FIG. 2 having a first lateral stabilizer in a stabilizing position.

FIG. 3 illustrates a perspective front view of the headrest 120 of FIG. 2 having the first lateral stabilizer 132 in a stabilizing position. The first lateral stabilizer 132 is moveably coupled to the central main body 130, such as via a pivot axle 150. Similarly, the second lateral stabilizer 134 is moveably coupled to the central main body 130, such as via a pivot axle 152. The pivot axles 150 and 152 may be coaxial. In at least one embodiment, a single pivot axle extends through the central main body 130 and pivotally couples both the first lateral stabilizer 132 and the second lateral stabilizer 134 to the central main body 130.

As shown, the pivot axles 150 and 152 extend outwardly from a lower portion of the central main body 130 and are pivotally retained within reciprocal bearings of the first lateral stabilizer 132 and the second lateral stabilizer 134, respectively. Optionally, the pivot axles 150 and 152 may inwardly extend from the first lateral stabilizer 132 and the second lateral stabilizer 134, respectively, and be pivotally retained within reciprocal bearings on opposite sides 133 and 135 of the central main body 130.

Each of the first lateral stabilizer 132 and the second lateral stabilizer 134 are configured to pivot about the respective pivot axles 150 and 152 in the directions of arc A between the retracted positions, shown in FIG. 2, and stabilizing positions (the first lateral stabilizer 132 is shown in the stabilizing position in FIG. 3). In the stabilizing positions, the front surfaces 138 and 140 of the respective first lateral stabilizer and the second lateral stabilizer 134 are oriented towards a downward direction. In the stabilizing positions, inner surfaces 153 and 154 of the respective first lateral stabilizer 132 and the second lateral stabilizer 134 are configured to provide lateral barriers that limit side-to-side motion of a head of an individual, thereby laterally stabilizing the head. The inner surfaces 153 and 154 may also be cushioned for comfort.

Referring to FIGS. 2, and 3, the first lateral stabilizer 132 and the second lateral stabilizer 134 are configured to move between the retracted positions, in which the front surfaces 138 and 140 of the respective first lateral stabilizer 132 and the second lateral stabilizer 134 are generally flush or otherwise coplanar with the front surface 136 of the central main body 130, and the stabilizing positions, in which respective top portions 160 and 164 and respective intermediate portions 162 and 166 of the first lateral stabilizer 132 and the second lateral stabilizer 134 are moved outwardly away and in front of a plane 170 in which the front surface 136 of the central main body 130 resides.

As shown, the first and second lateral stabilizers 132 and 134 are configured to rotate downwardly into the stabilizing positions to provide lateral barriers on respective sides 133 and 135 of the central main body 130. The lateral barriers provide resting surfaces for a head of an individual. As such, the central main body 130 supports the back of the head, and the lateral barriers defined by the first and second lateral stabilizers 132 and 134 in the stabilizing positions limit lateral movement of the head.

Figure 4:
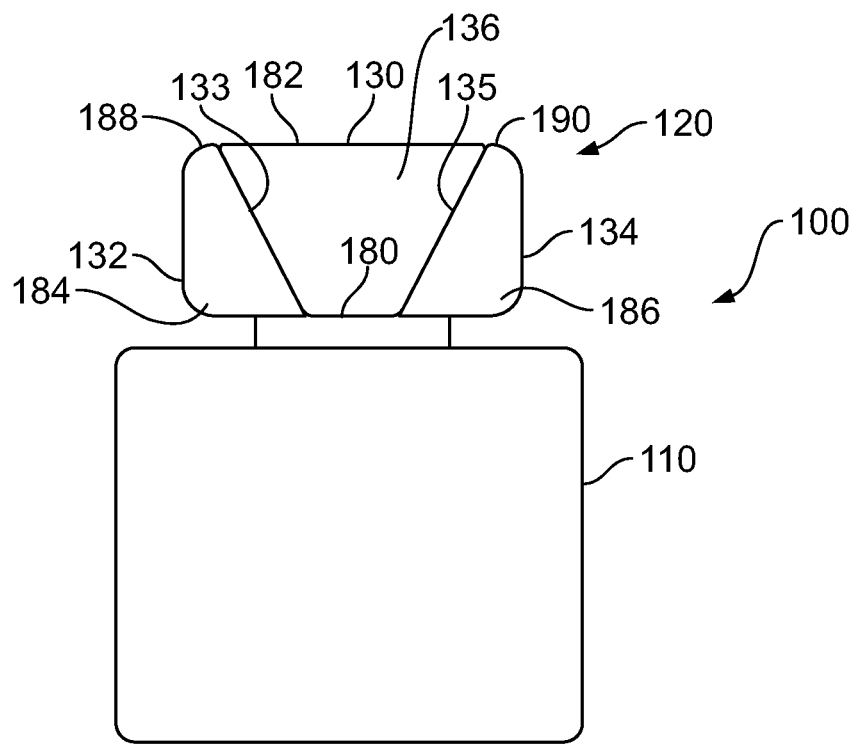
FIG. 4 illustrates a front view of the seat assembly, according to an embodiment of the present disclosure.

FIG. 4 illustrates a front view of the seat assembly 100, according to an embodiment of the present disclosure. As shown, the central main body 130 angles upwardly and outwardly on both sides 133 and 135 from a bottom 180 to a top 182. That is, the bottom 180 is narrower than the top 182. As such, each of the first lateral stabilizer 132 and the second lateral stabilizer 134 have a wide bottom 184 and 186 that outwardly recedes to a narrow top 188 and 190, respectively.

Figure 5:
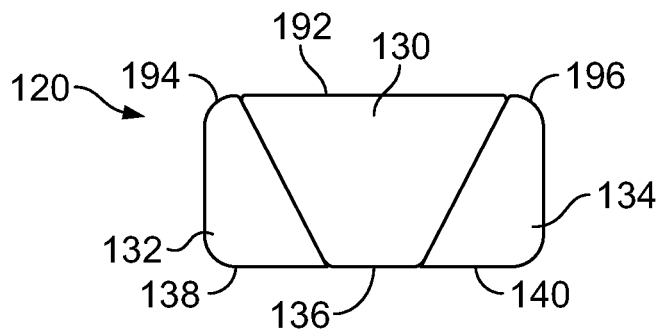
FIG. 5 illustrates a top view of the headrest of FIG. 4, according to an embodiment of the present disclosure.

FIG. 5 illustrates a top view of the headrest 120 of FIG. 4, according to an embodiment of the present disclosure. The central main body 130 may expand from the front surface 136 towards a rear surface 192. Conversely, each of the first lateral stabilizer 132 and the second lateral stabilizer 134 may recede from respective front surfaces 138 and 140 towards respective rear surfaces 194 and 196.

Figure 6:
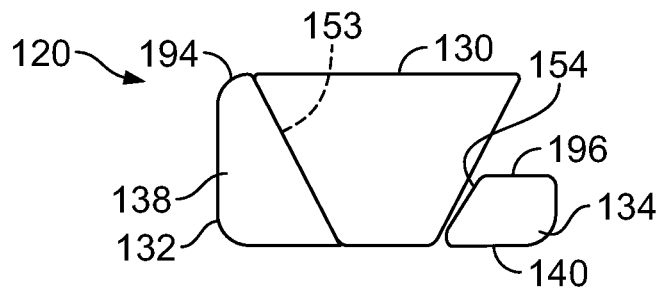
FIG. 6 illustrates a front view of the headrest of FIGS. 4 and 5.

FIG. 6 illustrates a front view of the headrest of FIGS. 4 and 5. As shown in FIG. 6, the first lateral stabilizer 132 is in the retracted position, and the second lateral stabilizer 134 is in the stabilizing position. The angled configurations of the first lateral stabilizer 132 and the second lateral stabilizer 134 as shown in FIGS. 4-6, for example, provide ergonomic, comfortable resting positions when the first lateral stabilizer 132 and the second lateral stabilizer 134 are in stabilizing positions. For example, as shown, the inner surfaces 153 and 154 outwardly cant from the front surfaces 138 and 140 (as shown in FIG. 6, the second lateral stabilizer 134 is in the stabilizing position and therefore the front surface 140 is oriented downwardly) towards the rear surfaces 194 and 196, which provides an ergonomic contour for resting a head and/or neck against. Optionally, the inner surfaces 153 and 154 may be curved and contoured for additional comfort.

The ergonomic surfaces shown in FIGS. 4-6 may be used with any of the embodiments of the present disclosure. For example, the ergonomic surfaces shown in FIGS. 4-6 may be used with respect to the seat assembly 100 shown in FIG. 1 and the headrest 120 shown in FIGS. 2 and 3.

Figure 7:
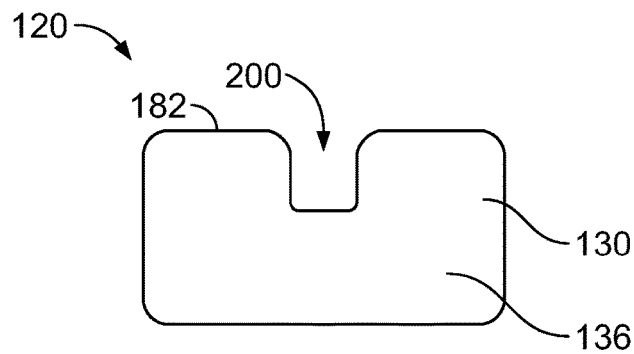
FIG. 7 illustrates a front view of a central main body of the headrest, according to an embodiment of the present disclosure.

FIG. 7 illustrates a front view of the central main body 130 of the headrest 120, according to an embodiment of the present disclosure. A notch 200 may extend into the central main body 130 proximate a central lateral plane at the top 182. The notch 200 is configured to receive and retain portions of a passenger's hair (such as a pony tail). In this manner, the notch 200 is configured to allow the passenger to rest in an ergonomically comfortably position without the head of the passenger being propped forward, such as by portions of hair, for example.

The notch 200 shown in FIG. 7 may be used with respect to any of the embodiments of the present disclosure. For example, the central main body 130 shown in FIGS. 2-6 may include the notch 200.

Figure 8:
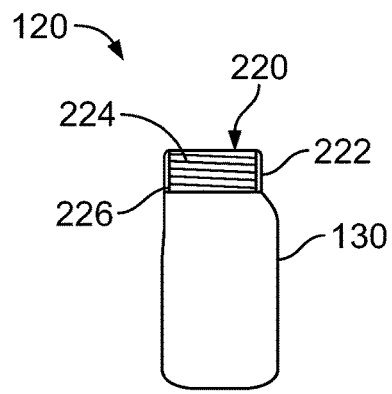
FIG. 8 illustrates a side view of the headrest, according to an embodiment of the present disclosure.

FIG. 8 illustrates a side view of the headrest 120, according to an embodiment of the present disclosure. A collapsible shade 220 may be secured to a top of the headrest 120, such as a top of the central main body 130, the first lateral stabilizer 132, or the second lateral stabilizer 134. In the collapsed position, the shade 220 may be collapsed and retained within a sleeve 222, for example.

The shade 220 may be accordion-like having a collapsible insert 224 (such as a wire frame or mesh) that is configured to collapse and extend and maintain a desired shape. A cover 226 (which may be formed of fabric) is positioned over the insert 224.

Figure 9:
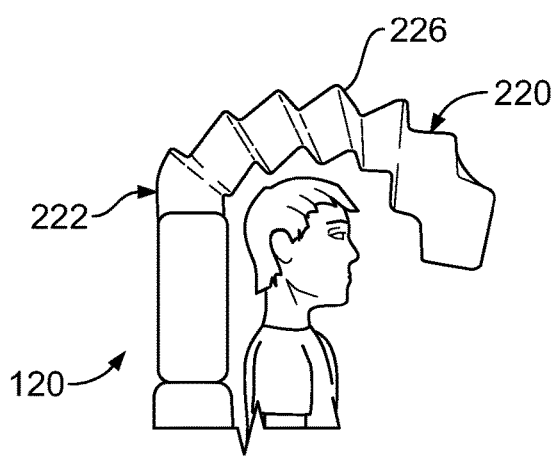
FIG. 9 illustrates a side view of the headrest of FIG. 8 having a shade in an extended, shading position.

FIG. 9 illustrates a side view of the headrest 120 of FIG. 8 having the shade 220 in an extended, shading position. An individual may grasp the shade 220 and pull the shade 220 into the shading position. In the shading position, the shade 220 provides shade for the individual, which may be desired when a seat assembly having the headrest 120 is in an aircraft, for example.

The shade 220 shown and described with respect to FIGS. 8 and 9 may be used with any of the embodiments of the present disclosure. For example, the headrest 120 shown in FIGS. 2-7 may include the shade 220 shown and described with respect to FIGS. 8 and 9.

Figure 10:
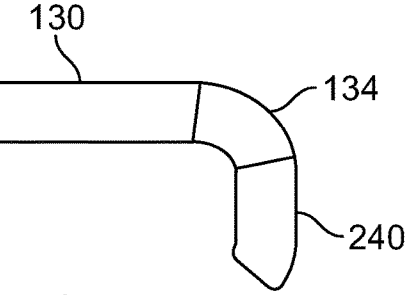
FIG. 10 illustrates a top view of the headrest, according to an embodiment of the present disclosure.

FIG. 10 illustrates a top view of the headrest 120, according to an embodiment of the present disclosure. As shown, lateral shades 240 may be configured to moveably retract and extend from surfaces of the first lateral stabilizer 132 and the second lateral stabilizer 134. As such, lateral shades may be moved to shading positions to provide shade and or privacy. The lateral shades 240 may be used with any of the embodiments of the present disclosure.

Figure 11:
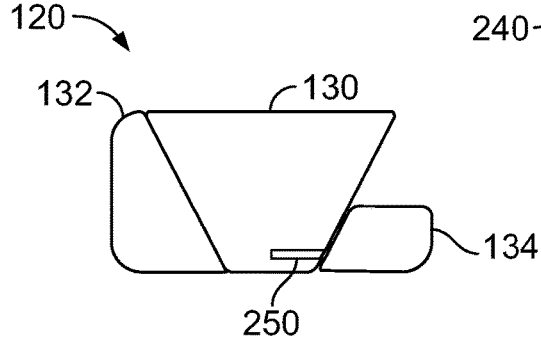
FIG. 11 illustrates a front view of the headrest, according to an embodiment of the present disclosure.

FIG. 11 illustrates a front view of the headrest 120, according to an embodiment of the present disclosure. In this embodiment, one or both of the first lateral stabilizer 132 and the second lateral stabilizer 134 may include a retractable chin rest 250 which is moveably coupled to inner surfaces thereof. The chin rest 250 may be moved to a chin-supporting position when the first lateral stabilizer 132 and/or the second lateral stabilizer 134 is in the stabilizing position. The chin rest 250 may telescope or articulate outwardly into the chin-supporting position. As another option, the chin rest 250 may pivot between a retracted position and the chin-supporting position. The chin rest 250 may be a cushioned beam or beams, for example. The chin rest 250 may be used with any of the embodiments of the present disclosure.

Figure 12:
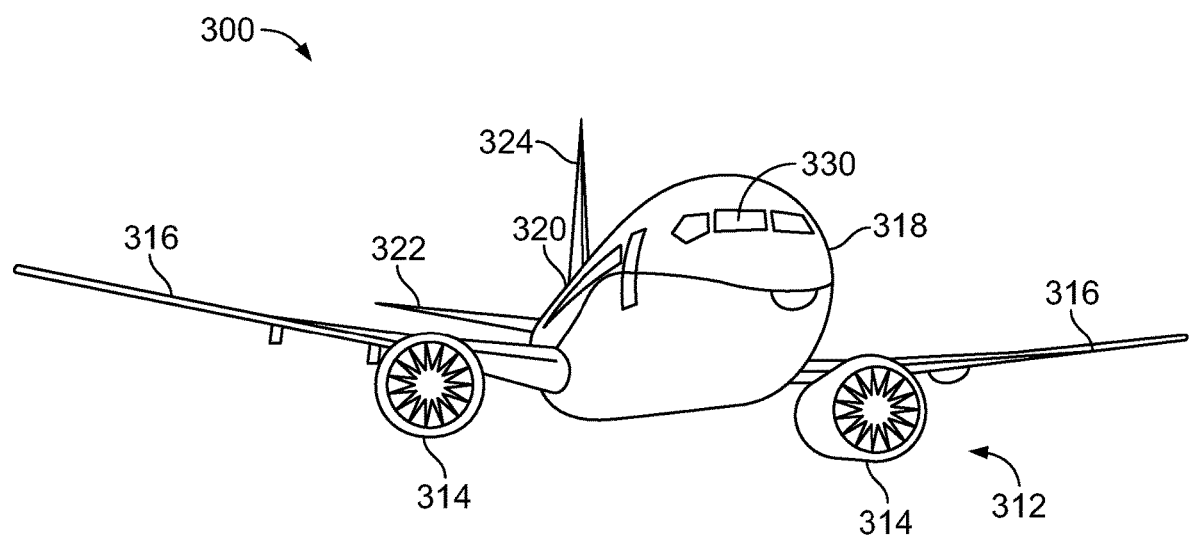
FIG. 12 illustrates a front perspective view of an aircraft.

FIG. 12 illustrates a front perspective view of an aircraft 300. The aircraft 300 includes a propulsion system 312 that may include two turbofan engines 314, for example. Optionally, the propulsion system 312 may include more engines 314 than shown. The engines 314 are carried by wings 316 of the aircraft 300. In other embodiments, the engines 314 may be carried by a fuselage 318 and/or an empennage 320. The empennage 320 may also support horizontal stabilizers 322 and a vertical stabilizer 324. The fuselage 318 of the aircraft 300 defines an internal cabin, which may include a cockpit 330.

The seat assembly 100 shown in FIG. 1 including any of the headrests 120 shown and described in the present application may be used within the aircraft 300, or various other vehicles. Passengers are seated on seat assemblies, such as the seat assembly 100 shown in FIG. 1, within the internal cabin. The passengers may be supported by the headrests 120 of the seat assemblies 100, as shown and described with respect to FIGS. 1-11. The aircraft 300 may be sized, shaped, and configured other than shown in FIG. 12.

Embodiments of the present disclosure may be used with various other vehicles other than aircraft. For example, the headrests 120 may be used with seat assemblies of land-based vehicles, water-based vehicles, or space-based vehicles. Further, embodiments of the present disclosure may be used in settings other than with vehicles. For example, individuals may use the headrests 120 with respect to seats, couches, beds, or the like in fixed structures (such as residences, office buildings, and/or the like).

As described herein, embodiments of the present disclosure provide headrests that are configured to allow a passenger to be supported in a stable, comfortable position, such as during a flight of a commercial aircraft. Further, embodiments of the present disclosure provide headrests that increase comfort and restfulness of an individual.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A headrest for a seat assembly, the headrest comprising:
a central main body having a first side and a second side that is opposite from the first side;
a first lateral stabilizer moveably coupled to the first side of the central main body, wherein the first lateral stabilizer is distinct from the central main body;
a second lateral stabilizer moveably coupled to the second side of the central main body, wherein the second lateral stabilizer is distinct from the central main body, wherein the first lateral stabilizer and the second lateral stabilizer are movable between retracted positions and stabilizing positions; and
a collapsible shade; wherein the collapsible shade is configured to be selectively moved between a collapsed position and an extended position, wherein the collapsible shade comprises: a collapsible insert configured to extend and maintain a desired shape; and a cover positioned over the collapsible insert.

2. The headrest of claim 1, wherein front surfaces of the first lateral stabilizer and the second lateral stabilizer are coplanar with a front surface of the central main body when the first lateral stabilizer and the second lateral stabilizer are in the retracted positions.

3. The headrest of claim 2, wherein at least portions of the first lateral stabilizer and the second lateral stabilizer are outwardly away from and in front of a plane of the front surface of the central main body when the first lateral stabilizer and the second lateral stabilizer are in the stabilizing positions.

4. The headrest of claim 1, wherein the first lateral stabilizer and the second lateral stabilizer are pivotally coupled to the central main body.

5. The headrest of claim 1, wherein the first lateral stabilizer and the second lateral stabilizer are pivotally coupled to the central main body through one or more pivot axles.

6. The headrest of claim 1, wherein the first lateral stabilizer and the second lateral stabilizer rotate downwardly into the stabilizing positions to provide lateral barriers on the first side and the second side of the central main body.

7. The headrest of claim 1, wherein the central main body is fixed in position in relation to a backrest.

8. The headrest of claim 1, wherein the central main body angles upwardly, and outwardly on the first side and the second side from a bottom to a top, and wherein each of the first lateral stabilizer and the second lateral stabilizer has a wide bottom that outwardly, recedes to a narrow top.

9. The headrest of claim 1, wherein the central main body expands from a front surface towards a rear surface, and wherein each of the first lateral stabilizer and the second lateral stabilizer recedes from a front surface towards a rear surface.

10. The headrest of claim 1, wherein inner surfaces of the first lateral stabilizer and the second lateral stabilizer outwardly cant from front surfaces towards rear surfaces.

11. The headrest of claim 1, wherein the central main body comprises a notch extending into a front surface of the central main body toward a rear surface of the main body at a top.

12. The headrest of claim 1, wherein one or both of the first lateral stabilizer or the second lateral stabilizer comprise a retractable chin rest.

13. The headrest of claim 1, wherein the collapsible shade is secured to a top of the central main body.

14. The headrest of claim 1, wherein the collapsible shade is secured to one of the first lateral stabilizer or the second lateral stabilizer.

15. The headrest of claim 1, wherein the collapsible insert includes a wire frame or mesh.

16. A seat assembly comprising:
    a base;
    a seat cushion coupled to the base;
    a backrest coupled to one or both of the base and the seat cushion; and
    a headrest coupled to the backrest, wherein the headrest comprises:
        a collapsible shade;
        a central main body having a first side and a second side that is opposite from the first side, wherein the central main body is fixed in position in relation to a backrest;
        a first lateral stabilizer pivotally coupled to the first side of the central main body, wherein the first lateral stabilizer is distinct from the central main body; and
        a second lateral stabilizer pivotally coupled to the second side of the central main body, wherein the second lateral stabilizer is distinct from the central main body,
        wherein each of the first lateral stabilizer and the second lateral stabilizer is movable between a retracted position and a stabilizing position,
        wherein front surfaces of the first lateral stabilizer and the second lateral stabilizer are coplanar with a front surface of the central main body when the first lateral stabilizer and the second lateral stabilizer are in the retracted positions,
        wherein at least portions of the first lateral stabilizer and the second lateral stabilizer are outwardly away from and in front of a plane of the front surface of the central main body when the first lateral stabilizer and the second lateral stabilizer are in the stabilizing positions, and
        wherein the first lateral stabilizer and the second lateral stabilizer rotate downwardly into the stabilizing positions to provide lateral barriers on the first side and the second side of the central main body; wherein the collapsible shade is configured to be selectively moved between a collapsed position and an extended position, wherein the collapsible shade comprises: a collapsible insert configured to extend and maintain a desired shape; and a cover positioned over the collapsible insert.

17. The seat assembly of claim 16, wherein the central main body angles upwardly and outwardly on the first side and the second side from a bottom to a top, wherein each of the first lateral stabilizer and the second lateral stabilizer has a wide bottom that outwardly recedes to a narrow top, wherein the central main body expands from a front surface towards a rear surface, wherein each of the first lateral stabilizer and the second lateral stabilizer recedes from a front surface towards a rear surface.

18. The seat assembly of claim 16, wherein the central main body comprises a notch extending into a front surface of the central main body toward a rear surface of the main body at a top.

19. The seat assembly of claim 16, wherein the collapsible insert includes a wire frame or mesh.

20. The seat assembly of claim 16, wherein one or both of the first lateral stabilizer or the second lateral stabilizer comprise a retractable chin rest.

* * * * *